United States Patent [19]
George et al.

[11] 3,988,489
[45] Oct. 26, 1976

[54] FIBER COATED THERMOPLASTIC

[75] Inventors: Philip D. George; Robert J. Boudreau, both of Glens Falls, N.Y.

[73] Assignee: General Electric Company, Hudson Falls, N.Y.

[22] Filed: Nov. 24, 1975

[21] Appl. No.: 634,425

Related U.S. Application Data

[60] Continuation of Ser. No. 487,551, July 11, 1974, abandoned, which is a continuation of Ser. No. 327,510, Jan. 29, 1973, abandoned, which is a division of Ser. No. 287,751, Sept. 11, 1972, Pat. No. 3,772,578.

[52] U.S. Cl. .................................. 428/216; 428/302
[51] Int. Cl.² ........................................ B32B 7/00
[58] Field of Search ................. 428/297, 303, 216; 174/25 R, 110 SR

[56] References Cited
UNITED STATES PATENTS

| | | |
|---|---|---|
| 3,077,514 | 2/1963 | Kang ........................... 174/25 R |
| 3,532,800 | 10/1970 | Wyly ........................... 174/25 R |

FOREIGN PATENTS OR APPLICATIONS

| | | |
|---|---|---|
| 623,731 | 7/1961 | Canada ........................... 174/25 R |
| 970,037 | 9/1964 | United Kingdom ............... 174/25 R |

OTHER PUBLICATIONS

Wente et al., "Manufacture of Superfine Organic Fibers", NRL Report, U.S. Dept. Commerce, 5-1954.
Lawrence et al., "An Improved Device for the Formation of Superfine Thermoplastic Fibers", NRL Report 5265, 2/1959.

*Primary Examiner*—E. A. Goldberg
*Attorney, Agent, or Firm*—J. J. Lichiello

[57] ABSTRACT

A thin polypropylene dielectric strip with a low density highly porous non-self supporting layer of super fine polypropylene fibers adhering thereto is disclosed. The strip is useful as an electrical capacitor dielectric and may be metallized as a capacitor electrode.

8 Claims, 12 Drawing Figures

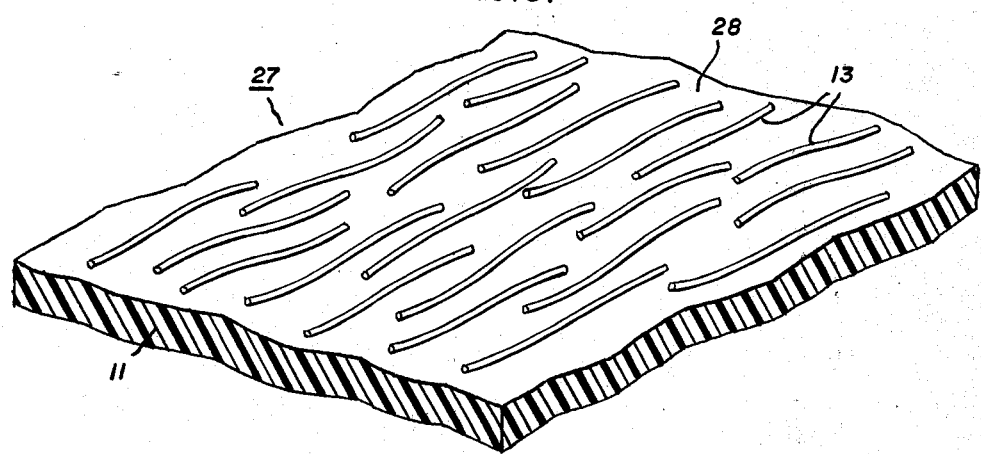
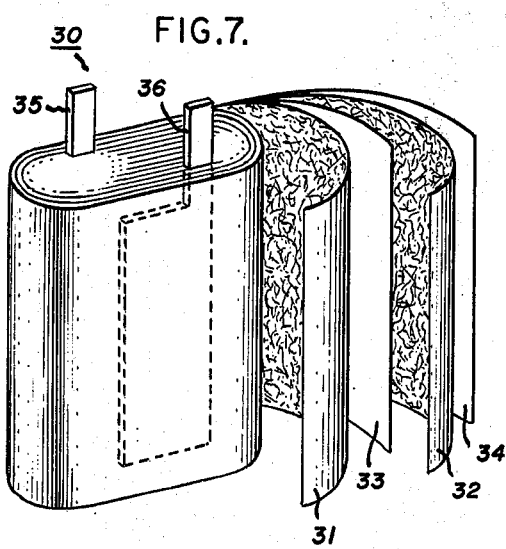
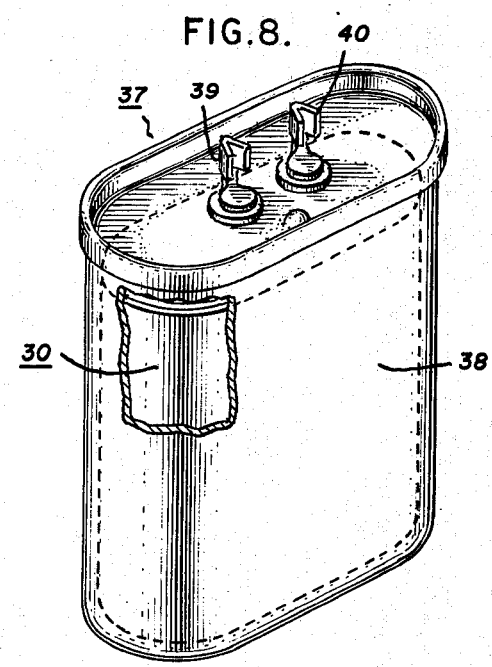

FIBER COATED THERMOPLASTIC

This is a continuation of application Ser. No. 487,551 filed July 11, 1974, now abandoned which was a continuation of application Ser. No. 327,510 filed Jan. 29, 1973, now abandoned, which was a division of application Ser. No. 287,751 filed Sept. 11, 1972, now U.S. Pat. No. 3,772,578.

BACKGROUND OF THE INVENTION

This invention relates to a super fine thermoplastic fiber coating or layer on a strip or sheet base member and, more particularly, to a polypropylene fiber coated polypropylene dielectric strip for use as a capacitor dielectric in a dielectric liquid impregnated capacitor.

Polypropylene film as a capacitor dielectric has become a prominent and outstanding dielectric for liquid impregnated capacitors. In U.S. Pat. No. 3,363,156, Cox, assigned to the same assignee as the present invention, there are disclosed numerous capacitor embodiments employing the combination of polypropylene film and chlorinated diphenyl liquid impregnant. The teachings of this patent are incorporated by reference in the present application.

The noted Cox patent describes a kind of impregnation of polypropylene film as "essentially complete impregnation" whereby the liquid impregnant passes through or permeates the molecular structure of the polypropylene film. In a capacitor roll section which is wound from a composite of alternate foil and film strips, the kind of impregnation referred to is most important but difficult to obtain because the liquid impregnant must proceed from the roll edge into the center parts of the roll. Polypropylene films tend to cling tightly to each other and to electrode foils, so that it is extremely difficult to provide essentially complete impregnation of all voids, interstices and spaces within the roll as well as within the materials.

In order to more expeditiously provide essentially complete impregnation, it has been the practice to utilize paper strips adjacent the film strips in a roll so that the paper may act as wicking to pass the liquid impregnant to the center parts of the roll. Paper strips are undesirable in that they represent an undesirable different dielectric in an otherwise all-film dielectric capacitor, and they reduce the volumetric efficiency and increase the dissipation factor of an otherwise all-film dielectric capacitor. The paper also represents a limitation on the kind of impregnant which may be employed. Any unimpregnated areas are sources of deleterious corona discharge even though they may later become impregnated by aging. Some areas become effectively blocked from being impregnated for a considerable period of time because of material nonuniformities, the presence of other materials, and other environmental causes.

Accordingly, it is known in the art that adjacent sticky surfaces of polypropylene to polypropylene, or polypropylene to foil may be modified to permit easier penetration of the impregnant. Among these modifications are included roughening of adjacent surfaces of abrasion and mechanical working, or coating of the surfaces with fine particle material such as talc and aluminum oxide. There are distinct disadvantages to these processes ranging from adversely affecting the physical characteristics of the dielectric, adding foreign matter to the capacitor, and particle control and uniformity.

It has been discovered that these and other disadvantages may be overcome by coating one or more adjacent dielectric surfaces with a light coating of super fine fibrous thermoplastic material. This fibrous material maintains sufficient uniform separation of adjacent surfaces to facilitate the entry and continued permeation of the impregnant.

Accordingly, it is an object of this invention to provide an improved super fine thermoplastic fiber coated base member as improved impregnation means for electrical capacitors.

It is another object of this invention to provide a super fine thermoplastic fiber coated dielectric surface in electrical capacitors.

It is a specific object of this invention to provide a polypropylene fiber coated polypropylene dielectric for electrical capacitors.

SUMMARY OF THE INVENTION

In accordance with an exemplary practice of this invention, polypropylene resin is passed through a high temperature extruder nozzle to produce very fine fibers or strands of polypropylene. These strands are taken from the extruder nozzle by the passage thereabout of high velocity heated air which stretches and thins the individual strands to super fine diameters which are less than about 0.2 $\mu$, and further causes them to impinge on a polypropylene film strip or sheet and adhere thereto to provide a fibrous, strand, or mat coating. The coating may vary from a very sparse coating of strands to substantial overlapping or intertwined layer. When such a strip is wound in a capacitor roll section, the strand layer provides proper interstices or channels between adjacent strip surfaces into which a liquid impregnant can readily penetrate and permeate.

BRIEF DESCRIPTION OF THE DRAWINGS

This invention will be best described in connection with the following description and the drawings in which:

FIG. 5 is a cross-sectional view of an oriented layer modification of the layer of FIG. 1.

FIG. 6 is a cross-sectional view of a sandwich modification of the layer of FIG. 1.

FIG. 7 is an exemplary capacitor roll section.

FIG. 8 is an exemplary single roll motor run capacitor.

DESCRIPTION OF THE PREFERRED EMBODIMENTS

Figure 1:
FIG. 1 is a cross-sectional view of strip having a fibrous layer thereon.

Referring now to FIG. 1, there is illustrated a composite 10 comprising a base member 11 and a light layer or coating 12 of thermoplastic fibrous strands 13 thereon. The base member 11 is preferably polypropylene for capacitor applications although for less important and demanding applications it may comprise other polyolefins, polycarbonates and polyesters. Alternatively, the base member 11 may be a metallic material such as aluminum, or it may be a thermoplastic material with a metallized coating thereon. In the preferred form of this invention, the base member 11 is a strip dielectric comprising polypropylene, and specifically a stereo regular isotactic polypropylene as described in U.S. Pat. No. 3,112,300 Natta et al. As used in the exemplary practice of this invention, the polypropylene base member 11 is a balanced biaxially oriented polypropylene with a thickness ranging generally below about 25 $\mu$ and preferably below about 18 $\mu$. The fibrous strands 13 may be any one of the noted thermoplastics, but in the preferred form of the invention are of the same dielectric material as the base member 11, i.e., polypropylene. The average diameter of these strands may be from about 0.1 $\mu$ to about 0.5 $\mu$, with 0.2 $\mu$ to 0.3 $\mu$ providing good results for polypropylene strands. These strands 13 may be of various lengths as determined by the process of their manufacture. Usually there is some variation in length, with lengths of from 0.25 cm (centimeters) to more than 1.25 cm. Longer lengths may be employed and the lengths of most of the strands in a given layer may be predetermined. In FIG. 1, the strands are defined as of random lengths, being on an average of less than about 1.25 cm.

In FIG. 1, the fibrous strand layer 12 may be referred to as a very light and very porous layer in which there is only a fair degree of fiber intertwining or entanglement with the result that the layer 12 has a porosity of about 50%. The layer 12 does not display the integrity, cohesiveness or uniformity of a blanket like cover, and the base member 11 is clearly visible through the layer 12. Visually as well as by feel, the layer 12 may be described as having a thin, wispy, or cotton like texture. Finger rubbing or similar abrasive action may dislodge parts of the layer. When using base members of less than about 15.0 $\mu$ thickness, and strand diameters of less than about 0.3 $\mu$ the total thickness of the FIG. 1 composite may remain less than about 16.0 $\mu$. Preferably base 11 thicknesses are below about 12.0 $\mu$ so that the total thickness is less than about 12.0 $\mu$ to 15.0 $\mu$. An excellent capacitor dielectric comprises a base 11 of about 6.0 $\mu$ and a layer 13 of strands whose average diameter is less than about 0.2 $\mu$ for a total thickness below about 7.5 $\mu$. The layer 12 is further described as essentially non self supporting and requires a suitable base member 11 for its support and retention. This is a significant feature as compared with prior laminates where large fiber diameter mats are bonded to a support member. In the present invention the layer is not adaptable to be self supporting because of its fineness and thinness and its principal capacitor dielectric application. Ordinarily no particular third element such as a bonding medium is required to join the fiber strands 13 to the base member 11 since the elevated temperature process utilized to provide the super fine polypropylene strands 13 inherently provides the bonding feature with a polypropylene base 11.

Figure 2:
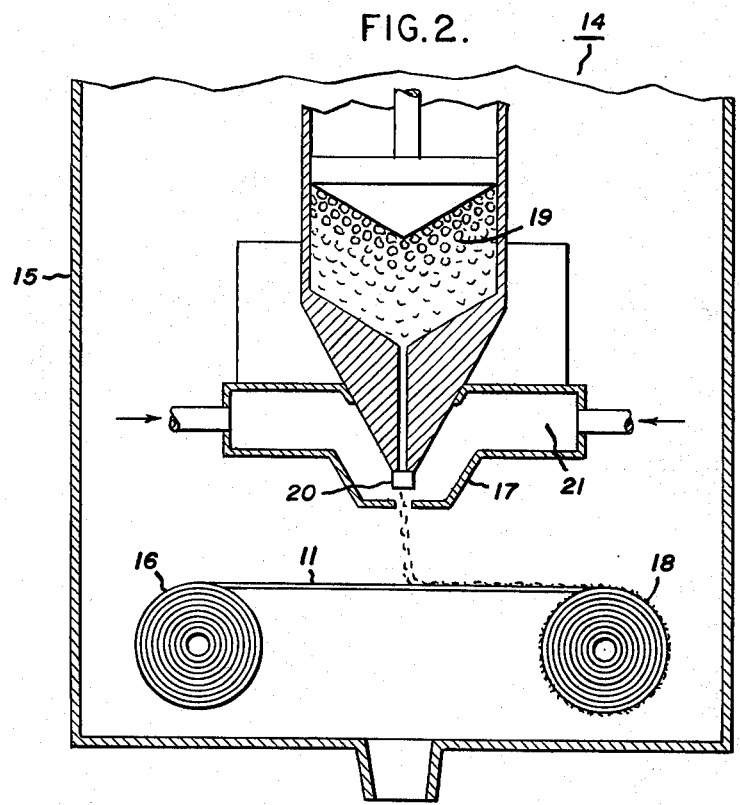
FIG. 2 is an illustration of an exemplary apparatus and method for carrying out this invention.

For example, a representative process and its apparatus 14 is shown in FIG. 2. Referring now to FIG. 2, a suitable chamber 15 includes a polypropylene supply roll 16, which supplies a moving polypropylene base 11 passing under extruder 17 and wound on roll 18. Molten polypropylene 19 is extruded through nozzle 20 through multiple apertures therein of a diameter which is generally slightly larger than the fiber strand diameter desired. A large quantity of hot air from a chamber 21 is caused to enter enclosure 15 in surrounding relation to nozzle 20 to draw the solidifying polypropylene strands from the apertures in nozzle 20 in such a manner that the strands are under sufficient tension to undergo elongation and diameter reduction. By this means, very small diameter strands, e.g., from about 0.1 $\mu$ to 0.2 $\mu$ in diameter may be produced. The described hot air flow maintains the strands in a heated condition as well as in a predetermined oriented or controlled position. These heated strands are caused to impinge on polypropylene base member 11 which may be held at some elevated temperature. Thus, there is a natural affinity between the strands and the web causing the two to stick together. The strands of layer 12 adhere tenaciously to base member 11 so that it may be wound on the further supply roll 18 and thereafter utilized in capacitor manufacture. A more detailed description of an apparatus and process for carrying out this invention is found in:

Naval Research Laboratory (NRL) Report No. 4364, Manufacture of Superfine Organic Fibers, Office of Technical Services, U.S. Department of Commerce, and An Improved Device for the Formation of Superfine Thermoplastic Fibers, K. D. Lawrence et al., NRL Report No. 5265, Feb. 11, 1959.

The foregoing process may be modified to change the character of the layer 12 so that a number of modifications of the composite 10 of FIG. 1 may be obtained.

Figure 3:
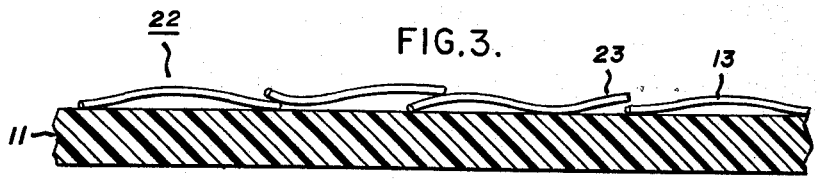
FIG. 3 is a cross-sectional view of a modified layer of FIG. 1.

One such modification is illustrated in FIG. 3. Referring now to FIG. 3, the composite 22 comprises a base member 11 with a modified layer 23 of superfine fibers 13 randomly disposed on and joined thereto. The layer 23 is best described as a very light transparent layer of insignificantly low density, and fiber intertwining or entanglement is at a minimum. The layer 23 may also be described as a very light dusting layer where substantial fiber overlap, entanglement, or intertwining is neither necessary nor even desired. The fibers may be described simply as predominately in a loose form or arrangement.

Figure 4:
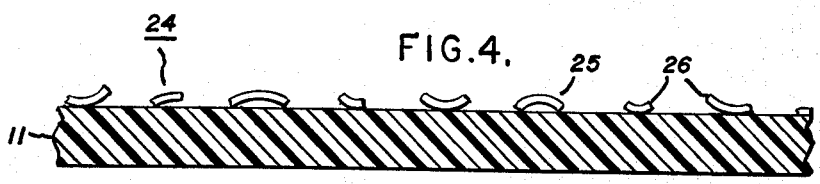
FIG. 4 is a cross-sectional view of a fuzz modification of the layer of FIG. 1.

An even further sparse layer is illustrated in FIG. 4. Referring now to FIG. 4, the composite 26 comprises a base member 11 coated with a layer 25 of modified strands 26. Strands 26 in this composite are modified to be as short as possible and may be predominately below about 0.2 $\mu$. Usually the layer 25 comprises a mixture of short strands and blocky particles which are widely dispersed over the base member 11. This layer 25 may also be described as a sprinkling of the particles and short strands over the base member 11. When the short strands predominate a fuzz like texture and appearance is indicated.

An orientation modification is shown in FIG. 5. In FIG. 5, the composite 27 comprises a base member 11 to which is attached a widely dispersed layer 28 of strands 13, characterized in that the air flow and nozzle 20 of FIG. 2 are chosen and controlled so that the strands 13 become predominately oriented in one direction. In this embodiment, the strands 13 may be longer and attach themselves to the base 11 over all or a considerable part of their length. Ordinarily, this embodiment comprises a light layer or a sparse layer of strands with minimum intertwining, but in some circumstances may approach the FIG. 1 embodiment in density. When producing an elongated strip or sheet of this embodiment, the orientation to be used may be chosen to enhance liquid impregnation in capacitors, i.e., the strands should be oriented strands and lie in the direction in which the liquid impregnant usually proceeds. This means that in an elongated strip or sheet, as is in common use for winding capacitor rolls the fibers lie with their longitudinal axes along the width or narrow dimension of the strip.

Any one of the embodiments in FIGS. 1, 3, 4 and 5 may be utilized to make up the FIG. 6 structure. Referring now to FIG. 6, there is disclosed a composite 29 comprising a pair of base supports 11 with an intermediate exemplary layer 12 of strands or fibers. This composite may be assembled from a pair of the FIGS. 1, 3, 4 and 5 embodiments positioned in opposite relationship so that the fiber layers are adjacent each other therebetween. Furthermore, the composite of FIG. 6 may be an integral one with the various parts joined together under heat and pressure, for example. Any of the composites of FIGS. 1, 3, 4 and 5 may be reversed so that the bases 11 become the center of the sandwich configuration. In this connection, both the bases and/or strands may be of dissimilar material.

If desirable, any of the composites described may be coated on opposite surfaces with a suitable layer of the other side. Furthermore, in any of the preceding FIGS. 1, 3, 4, 5 and 6 the density or porosity of the layer may be further modified by suitable compression for example, by passing a coated strip between compressing rolls which are preferably heated.

The embodiments as described for FIGS. 1, 3, 4, 5, and 6 are utilized to best effect in liquid impregnated capacitors. This involves combining one or more of the described structures where both the base member 11 and the layers comprise polypropylene between a pair of electrodes in a capacitor roll section as illustrated in FIG. 7.

Referring now to FIG. 7, a capacitor roll section 30 comprises a pair of foil electrode strips 31 and 32, and a pair of dielectric spacers or strips 33 and 34. This and other arrangements of electrodes and dielectric strips and their impregnation are described in detail in U.S. Pat. No. 3,363,156, Cox, assigned to the same assignee as the present invention. Roll section 30 also includes a pair of tap members 35 and 36 which provide electrical connection to the electrodes 31 and 32. Roll section 30 is then incorporated into a capacitor 37 of FIG. 8.

Referring now to FIG. 8, capacitor 37 comprises a can or casing 38 in which roll section 30 is contained. The tap members 35 and 36 are connected to terminals 39 and 40 of the casing 37 and the casing is filled with a liquid impregnant.

Figure 9:
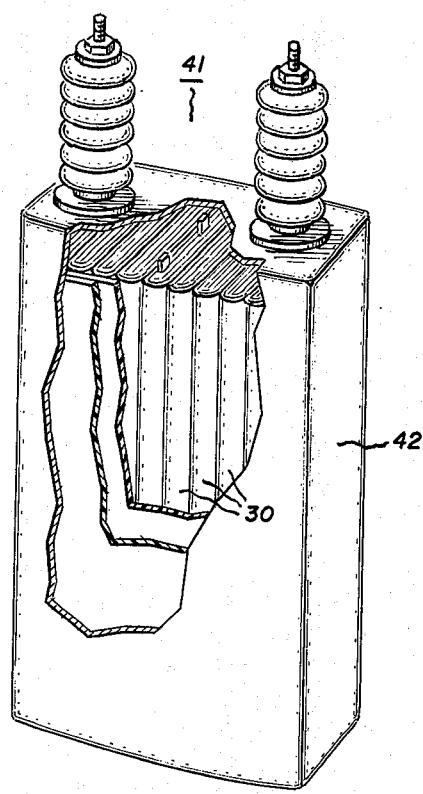

In FIG. 9, there is shown a power or large capacitor 41. This kind of capacitor utilizes a can or casing 42 which may include a volume of 1.0 cu. ft. or more and may also contain from 20 to 40 roll sections such as roll section 30 except that each roll section may be as much as 10 inches or more in length.

The capacitor roll section 30 is difficult to impregnate and must be impregnated when confined tightly in its can or casing. The tightly wound roll forces synthetic resin sheets tightly together or tightly against an electrode foil. This means that the roll section is in effect a metal walled cylinder and liquid impregnant must penetrate the ends of the roll and somehow pass into the central part of the roll. In the present invention, with the porous layer 12 utilized in strategic locations, for example between dielectric sheets, or particularly between a dielectric sheet and an electrode, the impregnant is provided with very small spaces or channels into which it can easily progress. More importantly, these passages permit rapid penetration of the impregnant into the roll from where the impregnant may pass transversely through the dielectric to reach other locations. While a suitable time temperature treatment may force a liquid impregnant like chlorinated diphenyl through a synthetic resin film such as polypropylene, progress is slow particularly for long rolls, tightly wound rolls and all-film rolls.

In a capacitor which utilizes only polypropylene film between the capacitor electrodes it is preferred that a composite like FIG. 1 is used. Alternatively where the roll thickness is critical the composite of FIGS. 3 or 4 are preferred. In some applications not only is the roll thickness of great importance, but the tightness of the roll winding makes impregnation very difficult even in small capacitors. In these capacitors the composite of FIG. 5 is preferred. Furthermore, the polypropylene base member may be coated with a layer of fibers of a material which will dissolve in the impregnant. For example the layer 12 of FIG. 1 may comprise polystyrene or atactic polypropylene and caused to dissolve during the impregnation process to facilitate impregnation.

In the embodiments as described for electrical capacitors, the various layers are laid down on a dielectric base 11. However, base 11 may also be an electrode foil since a porous or fibrous layer on a foil will serve an equivalent impregnation purpose in many instances. More importantly, however, the use of metallized electrodes in capacitors is becoming more prevalent. Such an electrode usually comprises a thin vapor deposited aluminum layer on a suitable dielectric base such as a synthetic resin film.

Figure 10:
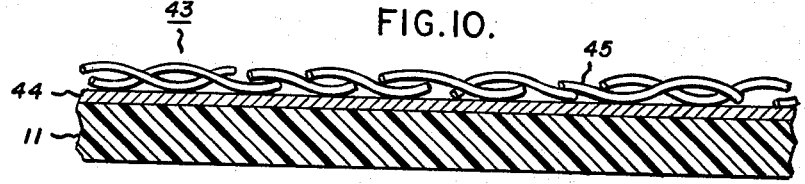
FIG. 10 is a modification showing the coating of this invention applied to a metallized layer of a dielectric strip.

This invention is applicable to such electrodes in several embodiments. First, the layer of this invention may be laid down directly on the metallized layer such as illustrated in FIG. 10. In FIG. 10 the composite 43 comprises a base member 11 of a suitable dielectric polypropylene film and a metallized layer 44 of aluminum thereon. A suitable fiber layer 45 such as those layers of FIGS. 1, 3, and 4 is provided on the metal layer 44. Where the metal layer is utilized on both sides of base member 11, the layer 45 may also be applied to both sides.

Figure 11:
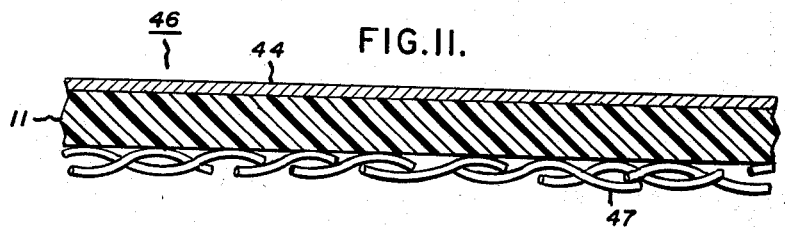
FIG. 11 is a modification of the FIG. 10 embodiment showing the coating of this invention on the non-metallized surface of FIG. 10.

If the electrode structure requires both the metallized layer and the strand layer separately, the composite 46 of FIG. 11 may be employed. In FIG. 11 the composite 46 is similar to that of FIG. 10 except that a suitable fibrous layer 47 is provided on the film surface opposite to that film surface having the metallized layer thereon.

In the FIGS. 10 and 11 embodiments the metallized layer is utilized as an electrode in the capacitor, such as electrodes 31 and 32 of FIG. 7. It is desirable in many instances to have more metal areas available for the electrode. However, the area is limited by the strip widths of the dielectric. In other instances the electrode whether an integral foil or a metallized layer is a hindrance or metal barrier to impregnation. These problems are overcome in this invention by metallizing the various layers and coatings so described. Vapor metallizing provides metal deposition significantly throughout the fiber layer and coats individual strands within the structure. As one process, other metal deposition processes such as solution deposition will provide more significant penetration and coverage. There is thus provided a porous electrode structure to facilitate impregnation.

Figure 12:
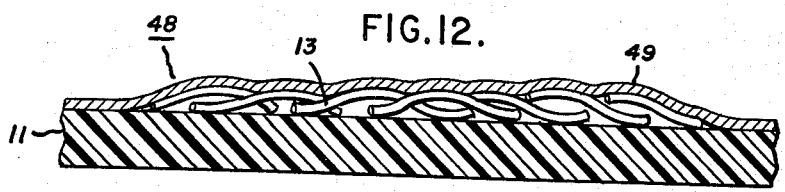
FIG. 12 is an illustration of a metallized base and layer composite.

FIG. 12 is an enlarged representative view of a metallized layer of this invention. In FIG. 12, the composite 47 comprises a film base member 11 and a fiber strands 13 distributed as a layer thereon. The metal layer 43 is shown on the base member 11 as well as on the fibers 13 particularly on those exposed internal areas between the fibers 13 and the base 11.

This invention is broadly applicable to capacitors because of the fact that the layer itself may be quite thin, for example in the 2.5 $\mu$ to 5 $\mu$ thickness range. The advantage in thinness means that the capacitor roll section is not inordinately increased in width. The layer may also not be a specific dielectric sheet for capacitor design purposes and its porosity may therefore be discounted in the design stress on the dielectric.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

What is claimed as new and desired to be secured by Letters Patent of the United States is:

1. As an article of manufacture, the combination comprising a thin thermoplastic sheet base member and a non self-supporting layer of small diameter elongated extruded fibers of a thermoplastic material adhering to said base, on at least one side thereof, said fibers having an average diameter less than about 0.3 $\mu$ and less than 2.5 cm in length, the said base member being less than about 15 $\mu$ in thickness and said layer being less than about 4 $\mu$ in thickness, said fibers constitute a thin layer whose porosity is greater than about 50% and said fibers are joined to said polypropylene base by a natural affinity bond.

2. The invention as recited in claim 1 wherein said base member is polypropylene.

3. The invention as recited in claim 2 wherein said fibers are polypropylene.

4. The invention as recited in claim 3 wherein the said fibers are randomly oriented.

5. The invention as recited in claim 3 where said fibers are predominately oriented in one direction with respect to said base member.

6. The invention as recited in claim 3 wherein the major proportion of said fibers are intertwined and overlap in a mat-like arrangement.

7. The invention as recited in claim 3 wherein each side of said base includes a layer of said fibers.

8. As an article of manufacture the combination comprising a thin sheet base member and a non self-supporting layer of small diameter elongated extruded fibers of a thermoplastic material adhering to said base on at least one side thereof, said fibers having an average diameter less than 0.3 $\mu$ and less than 2.5 cm in length the said base member being less than about 15 $\mu$ in thickness and said layer being less than about 4 $\mu$ in thickness, the said article being produced by the process of a. melt extruding superfine polypropylene fibers from an extruder b. in a heated atmosphere, stretching said fibers to reduce their diameter and to cause severance of said fibers from said extruder and c. causing said severed fibers to impinge on said base member and to fusion bond thereto.

* * * * *